US011860427B2

(12) United States Patent
Benzoni et al.

(10) Patent No.: US 11,860,427 B2
(45) Date of Patent: Jan. 2, 2024

(54) THERMOSONIC BONDING FOR SECURING PHOTONIC COMPONENTS

(71) Applicant: ROCKLEY PHOTONICS LIMITED, Altrincham (GB)

(72) Inventors: Albert Benzoni, South Pasadena, CA (US); Shuhe Li, Pasadena, CA (US)

(73) Assignee: Rockley Photonics Limited, Altrincham (GB)

( * ) Notice: Subject to any disclaimer, the term of this patent is extended or adjusted under 35 U.S.C. 154(b) by 0 days.

(21) Appl. No.: 17/839,405

(22) Filed: Jun. 13, 2022

(65) Prior Publication Data
US 2022/0397730 A1 Dec. 15, 2022

(30) Foreign Application Priority Data

Jun. 15, 2021 (GB) .................................... 2108533

(51) Int. Cl.
*G02B 6/42* (2006.01)
(52) U.S. Cl.
CPC ......... *G02B 6/4245* (2013.01); *G02B 6/4243* (2013.01)
(58) Field of Classification Search
None
See application file for complete search history.

(56) References Cited

U.S. PATENT DOCUMENTS

| 2004/0264866 | A1 | 12/2004 | Sherrer et al. |
| 2015/0316723 | A1 | 11/2015 | Taylor et al. |
| 2018/0239095 | A1 | 8/2018 | Wade et al. |
| 2020/0073064 | A1* | 3/2020 | Scholz ................. G02B 6/4245 |
| 2022/0397730 | A1* | 12/2022 | Benzoni .............. G02B 6/4245 |

FOREIGN PATENT DOCUMENTS

JP 11-344649 A 12/1999

OTHER PUBLICATIONS

U.K. Intellectual Property Office Search Report, dated Nov. 3, 2021, for Patent Application No. GB2108533.7, 4 pages.
Website: "Device-related Systems," Panasonic Connect, printed on May 17, 2023, 22 pages, Panasonic, https://industrial.panasonic.com/ww/products/fa-welding/fa/device-related/fc_bonder/md-p200us2.

* cited by examiner

*Primary Examiner* — Jerry Rahll
(74) *Attorney, Agent, or Firm* — Lewis Roca Rothgerber Christie LLP

(57) ABSTRACT

The present disclosure includes a method of securing a photonic component to a semiconductor chip, the method including forming a thermosonic bond between the semiconductor chip and a cap to fix the cap against the photonic component. The present disclosure also includes an apparatus including a semiconductor chip having a V-groove, an optical fiber in the V-groove, and a cap secured to the semiconductor chip through a bond including a metal bump, wherein the cap fixes the optical fiber in the V-groove.

20 Claims, 5 Drawing Sheets

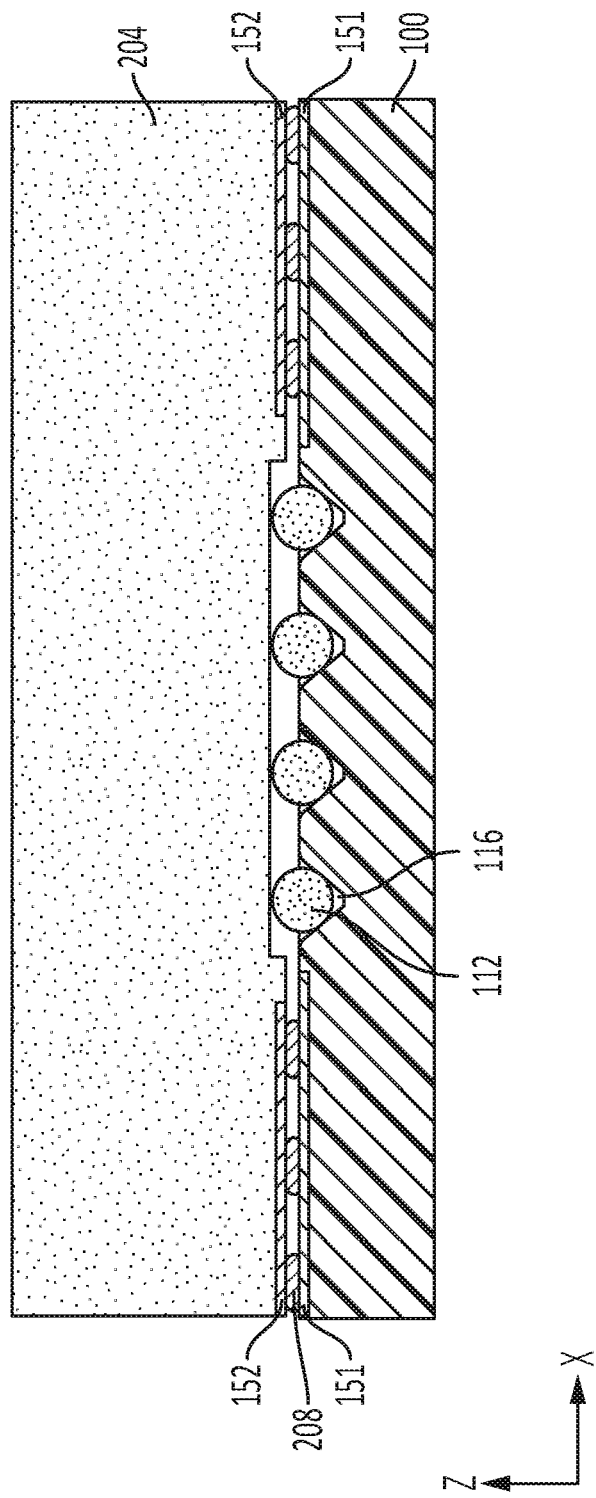

THERMOSONIC BONDING FOR SECURING PHOTONIC COMPONENTS

CROSS-REFERENCE TO RELATED APPLICATION(S)

This application claims priority to United Kingdom Patent Application No. 2108533.7, filed in the United Kingdom Intellectual Property Office on Jun. 15, 2021, entitled "THERMOSONIC BONDING FOR SECURING PHOTONIC COMPONENTS", which is incorporated by reference herein in its entirety.

FIELD

One or more aspects of embodiments according to the present invention relate to methods of securing photonic components onto a substrate and to apparatuses having photonic components secured onto a substrate.

BACKGROUND

Optical fibers may be secured in V-grooves of a substrate through various means, such as by an adhesive epoxy. However, the properties of adhesive epoxies may change significantly with temperature and humidity. For example, a change in temperature may cause the epoxy to shrink or expand, which may either cause the epoxy to move (e.g., pull) the optical fibers or else cause bond failure (e.g., breakage) in the epoxy and thereby allow the optical fibers to move. Accordingly, misalignment between the optical fibers and other photonic components may occur, causing an undesirable change in optical power transmission and reflection.

Thus, there is a need for improved means for securing optical fibers in V-grooves.

SUMMARY

According to an embodiment of the present disclosure, there is provided a method of securing a photonic component to a semiconductor chip, the method including: forming a thermosonic bond between the semiconductor chip and a cap to fix the cap against the photonic component.

In some embodiments, the photonic component includes an optical fiber in a V-groove in the semiconductor chip, wherein the method further includes positioning the cap above the optical fiber with a metal bump between the semiconductor chip and the cap, and wherein the thermosonic bond is formed between the semiconductor chip and the cap through the metal bump to press the cap against the optical fiber.

In some embodiments, the forming of the thermosonic bond includes: heating the metal bump; applying pressure to the metal bump; and applying ultrasonic power to the metal bump.

In some embodiments, a portion of the heat is applied to the metal bump by heating the semiconductor chip, wherein the pressure is applied to the metal bump by applying pressure to the cap, and wherein the ultrasonic power is applied to the metal bump by applying ultrasonic power to the cap.

In some embodiments, a first metal pad is fixed to one of the semiconductor chip or the cap, and the metal bump is between the first metal pad and the other one of the semiconductor chip or the cap, and wherein the thermosonic bond is formed between the metal bump and first metal pad.

In some embodiments, the metal bump includes, as a major component, a material selected from the group consisting of gold, aluminum, and copper, and wherein the first metal pad includes, as a major component, a material selected from the group consisting of gold, aluminum, and copper.

In some embodiments, the metal bump includes gold as a major component and the first metal pad includes aluminum as a major component or gold as a major component.

In some embodiments, the method further includes: forming the first metal pad on the semiconductor chip; and forming the metal bump on the cap, wherein the thermosonic bond is formed between the metal bump and the first metal pad.

In some embodiments, a second metal pad is fixed to the other one of the semiconductor chip or the cap, and wherein the metal bump is on the second metal pad.

In some embodiments: a waveguide is on the semiconductor chip and an end of the optical fiber is aligned with an end of the waveguide; the positioning of the cap includes positioning the cap to cover: a first portion of the semiconductor chip adjacent to the optical fiber, and a second portion of the semiconductor chip adjacent to the waveguide; the metal bump is between the first portion of the semiconductor chip and the cap; another metal bump is between the second portion of the semiconductor chip and the cap; and the thermosonic bond between the semiconductor chip and the cap is formed through the metal bump and the other metal bump.

In some embodiments: the semiconductor chip has a plurality of V-grooves including the V-groove, each of a plurality of optical fibers including the optical fiber is in a corresponding one of the plurality of V-grooves, a plurality of waveguides including the waveguide are on the semiconductor chip, ends of the plurality of optical fibers are aligned with corresponding ends of the plurality of waveguides, and the cap is thermosonically bonded to the semiconductor chip through a plurality of metal bumps including the metal bump and the other metal bump.

In some embodiments, a first metal pad is on the first portion of the semiconductor chip and a second metal pad is on the cap with the metal bump between the first metal pad and the second metal pad, wherein a third metal pad is on the second portion of the semiconductor chip and a fourth metal pad is on the cap with the other metal bump between the third metal pad and the fourth metal pad, wherein forming the thermosonic bond includes: forming a thermosonic bond between the metal bump and the first metal pad or the second metal pad, and forming another thermosonic bond between the other metal bump and the third metal pad or the fourth metal pad.

In some embodiments: a plurality of first metal pads are on the semiconductor chip; a plurality of second metal pads are on the cap, each of the second metal pads overlapping a corresponding first metal pad; a corresponding plurality of metal bumps is between each of the second metal pads and the corresponding first metal pad; and the forming of the thermosonic bond includes forming a thermosonic bond between each of the second metal pads and the corresponding first metal pad through the corresponding plurality of metal bumps.

In some embodiments, the forming of the thermosonic bond further includes: heating the semiconductor chip; applying pressure to the cap; and applying ultrasonic power to the cap.

In some embodiments, an end of the photonic component is aligned with an end of another photonic component.

According to an embodiment of the present disclosure, there is provided an apparatus, including: a semiconductor chip having a V-groove; an optical fiber in the V-groove; and a cap secured to the semiconductor chip through a bond including a metal bump, the cap fixing the optical fiber in the V-groove.

In some embodiments, the apparatus further includes a first metal pad fixed to one of the semiconductor chip or the cap and adjacent to the optical fiber, wherein the metal bump bonds the first metal pad and the other one of the semiconductor chip or the cap together.

In some embodiments, the first metal pad and the metal bump each includes, as a major component, a material selected from the group consisting of gold, aluminum, and copper.

In some embodiments, the metal bump includes gold, as a major component, and wherein the first metal pad includes, as a major component, aluminum or gold.

In some embodiments, the first metal pad is fixed to the semiconductor chip, wherein the apparatus further includes: a second metal pad fixed to the cap, overlapping the first metal pad, and bonded to the cap through the metal bump; a waveguide on the semiconductor chip, an end of the waveguide aligned with an end of the optical fiber; a third metal pad fixed to the semiconductor chip and adjacent to the waveguide; a fourth metal pad fixed to the cap and overlapping the third metal pad; and another metal bump bonding the third metal pad and the fourth metal pad together.

BRIEF DESCRIPTION OF THE DRAWINGS

Features, aspects, and embodiments are described in conjunction with the attached drawings, in which:

FIG. 5 is a cross-sectional view of an apparatus, according to an embodiment of the present invention.

DETAILED DESCRIPTION

The detailed description set forth below in connection with the appended drawings is intended as a description of exemplary embodiments of a method of securing an optical fiber (e.g., securing an end of the optical fiber) in a V-groove and corresponding apparatuses in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the scope of the invention. As denoted elsewhere herein, like element numbers are intended to indicate like elements or features.

Figure 1:
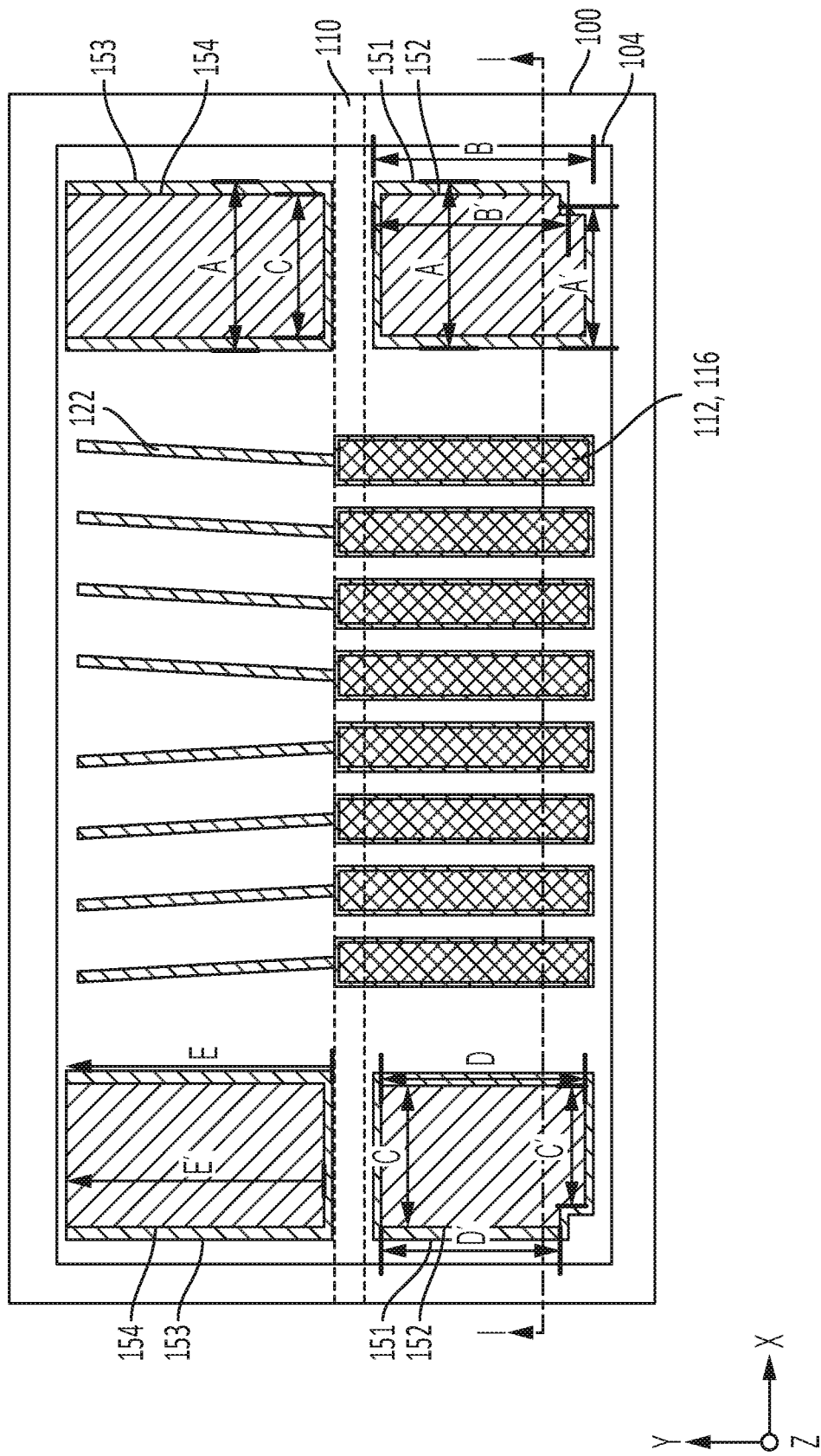
FIG. 1 is a top-down view of an apparatus according to an embodiment of the present invention.
Figure 2:
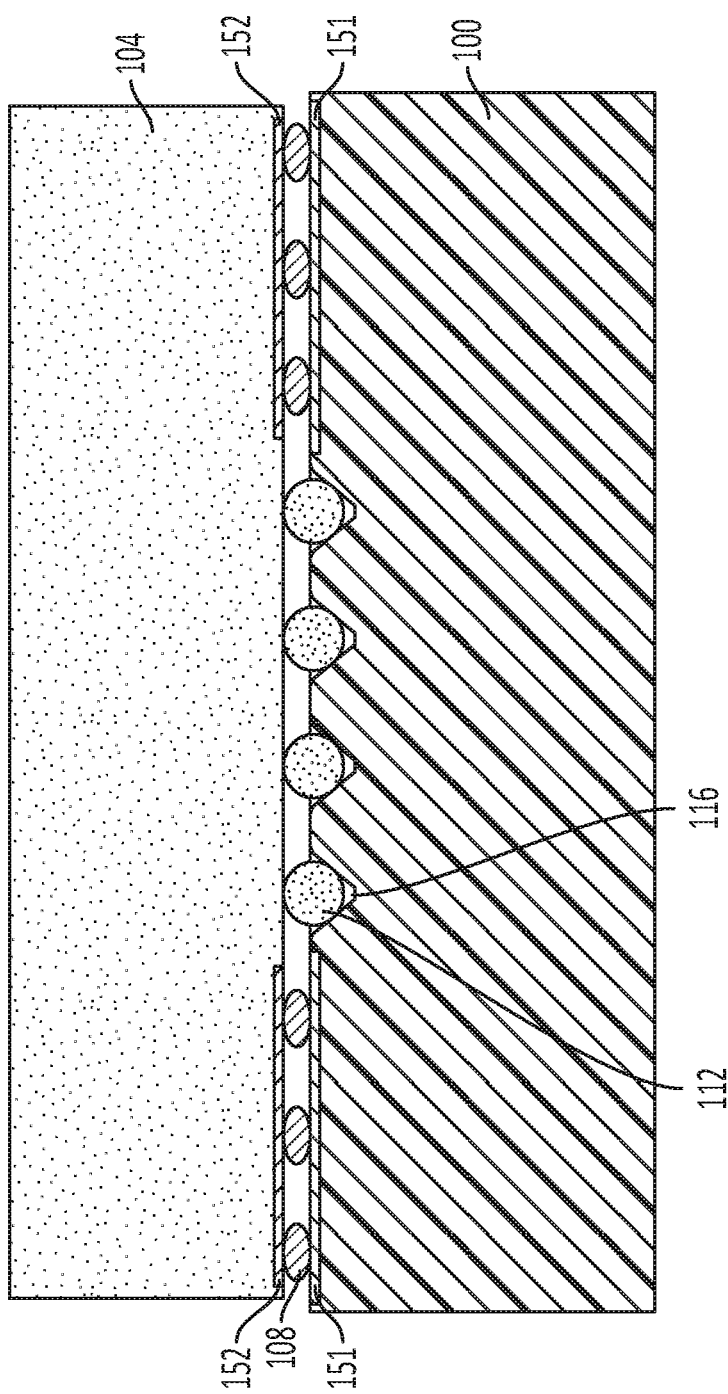
FIG. 2 is a cross-sectional view of the apparatus of FIG. 1 along the line I-I.

FIG. 1 shows a top-down view of an apparatus, and FIG. 2 shows a cross-sectional view of the apparatus of FIG. 1 along line I-I. FIG. 1 is drawn to scale, for one embodiment. FIGS. 1 and 2 show a photonic integrated circuit (PIC) 100 having a plurality of V-grooves 116 in an upper surface of the PIC 100, a plurality of optical fibers 112 in the V-grooves 116, a plurality of waveguides 122 on the PIC 100, and a cap 104 covering—and thermosonically bonded to—a portion of the PIC 100. Ends of the optical fibers 112 may be aligned with ends of corresponding ones of the waveguides 122. The V-grooves 116 may be formed by machining or by an anisotropic etch process. The PIC 100 may include a trench 110 (formed, e.g., by etching or by a saw cut that does not cut all the way through the wafer) in the upper surface of the PIC 100 at an end of the V-grooves 116 where the optical fibers 112 are coupled to (e.g., interface with) the waveguides 122. The forming of the trench 110 may remove a ramp that may be present at the proximal end of each V-groove 116 after the forming of the V-grooves 116 (e.g., if the V-grooves 116 are formed using an anisotropic etch). As used herein, the "proximal end" of a V-groove or fiber is the end nearest the corresponding waveguide. The trench 110 may extend in a direction (e.g., an X-axis direction) substantially perpendicular to a direction (e.g., the Y-axis direction) in which the V-grooves 116 extend. In some embodiments, the trench 110 may include a wall that a lower portion of the proximal end of each of the optical fibers 112 abuts against, such that a small gap is provided between the optical fibers 112 and the waveguides 122. Thus, the wall of the trench 110 may prevent the optical fibers 112 from abutting against the waveguides 122. As used herein, a "photonic integrated circuit" or "PIC" is a semiconductor chip that includes at least one optical waveguide and that may include active elements, such as an optical modulator or a photodetector. Although examples involving a PIC 100 are described in the present disclosure, the present disclosure is not limited thereto. For example, the present disclosure includes embodiments where a different semiconductor chip (i.e., a semiconductor chip that is not a PIC) is used instead of the PIC 100.

Thermosonic bonding of the cap 104 to the PIC 100 may be used to press the optical fibers 112 into the V-grooves 116 (or to "fix" or "secure" the optical fibers 112 in the V-grooves 116) to prevent lateral movement (e.g., movement along the direction of the X-axis or the Z-axis shown in FIG. 1) of the optical fibers 112, and thus to prevent the optical fibers 112 from becoming misaligned from the waveguides 122. Thermosonic bonding provides a fast and clean method of securing the optical fibers 112 in the V-grooves 116 compared to other methods such as using an adhesive epoxy.

The PIC 100 may include one or more first metal pads 151 (e.g., two first metal pads, in the embodiment of FIG. 1) on a surface of the PIC 100 facing the cap 104 and adjacent to the optical fibers 112, and the cap 104 may include one or more second metal pads 152 on a surface of the cap 104 facing PIC 100 and overlapping corresponding ones of the first metal pads 151. The PIC 100 may further include one or more third metal pads 153 on the surface of the PIC 100 facing the cap 104 and adjacent to the waveguides 122, and the cap 104 may further include one or more fourth metal pads 154 on a surface of the cap 104 facing the PIC 100 and overlapping corresponding ones of the third metal pads 153. Although FIGS. 2-5 illustrate the first and second metal pads 151 and 152 as respectively being recessed into an upper surface of the PIC 100 and a lower surface of the cap 104, the present disclosure is not limited thereto, and it will be understood that the metal pads (e.g., the first to fourth metal pads 151 to 154) may be on (e.g., formed by being deposited on) their respective surfaces without being recessed into their respective surfaces. A plurality of metal bumps 108 may be provided between the first and second metal pads 151 and 152 as well as between the third and fourth metal pads 153 and 154. The cap 104 may be thermosonically bonded to the PIC 100 through the metal bumps 108. The one or more first metal pads 151 (and similarly the second, third, and fourth metal pads) are referred to herein in the plural (e.g., first metal "pads") even though there may be only one such pad.

The cap 104 and the PIC 100 may each include silicon (e.g., be composed of silicon), but the present disclosure is not limited thereto. For example, the cap 104 may include (e.g., be composed of) glass. The first to fourth metal pads 151-154 may each be secured to the PIC 100 or to the cap 104 by any suitable means, for example, by an intervening adhesion layer.

The metal bumps 108 and the first to fourth metal pads 151-154 may each include any metal suitable for allowing the first to fourth metal bumps 108 to be thermosonically bonded to the first metal pads 151 or the second metal pads 152 and to the third metal pads 153 or the fourth metal pads 154. Soft metals may generally be more conducive for thermosonic bonding, and the two surfaces being bonded together (e.g., the surface of a metal bump 108 and the surface of metal pad to which it is being bonded) may each include as a major component (e.g., be) aluminum, gold, copper, or alloys thereof. The metal bumps 108 and the first to fourth metal pads 151-154 may each include (e.g., be) aluminum, gold, copper, or alloys thereof. In some embodiments, the metal bumps 108 may be gold or gold-coated copper, and the first to fourth metal pads 151-154 may each be aluminum. The selection of the composition of the metal pads may in some circumstances be influenced by process steps used in the fabrication of the PIC, which may involve depositing a layer of aluminum or gold for another feature of the PIC. In such a case the same process step may be used to form the first pads 151 or the third pads 153 at the same time.

The metal pads may have any suitable shape and any suitable set of dimensions. As an example, in FIG. 1, the width A may be 421 micrometers (μm), the width A' may be 364 μm, the length B may be 557 μm, the length B' may be 507 μm, the width C may be 357 μm, the width C' may be 307 μm, the length D may be 507 μm, the length D' may be 454 μm, the length E may be 671 μm, and the length E' may be 646 μm. Each of the values of A, A', B, B', C, C', D, D', E, and E' may be within 50% of the respective above-recited value, but the present disclosure is not limited thereto.

A process for forming the apparatus of FIGS. 1 and 2 will now be described with reference to FIGS. 3 and 4, which show a cross-sectional view of the apparatus of FIG. 1 along line I-I before and after the cap 104 has been thermosonically bonded to the PIC 100.

Before the cap 104 is thermosonically bonded to the PIC 104, the first to fourth metal pads 151-154 and the metal bumps may be formed. The first to fourth metal pads 151-154 may be formed on the PIC 100 or on the cap 104 by any suitable means (e.g., evaporation, plating, or sputtering). The first metal pads 151 and the third metal pads 153 may be formed at any suitable location on the PIC 100. For example, the first metal pads 151 may be formed adjacent to the V-grooves 116 (e.g., on either side of the V-grooves 116), and the third metal pads 153 may be formed adjacent to the waveguides 122 (e.g., on either side of the waveguides 122). In order to fix each of the metal pads to a respective surface of the PIC 100 or of the cap 104, an adhesion layer or barrier layer may be formed on the respective surface, and the metal pad may be formed on, or affixed to, the adhesion layer or the barrier layer. In some embodiments, the cap 104 may be formed by forming a silicon wafer, metalizing a surface of the silicon wafer, and dividing (e.g., dicing) the silicon wafer into a plurality of silicon caps, each silicon cap including metal pads formed from the metallization of the silicon wafer.

The metal bumps 108 may be formed on the metal pads by any suitable means (e.g., wire bonding, stud bumping, plating, or sputtering). In some embodiments, the metal bumps 108 may all be formed on the second and fourth metal pads 152 and 154 of the cap 104. In other embodiments, the metal bumps 108 are all formed on the first and third metal pads 151 and 153 of the PIC 100. In still other embodiments, each of the first to fourth metal pads 151-154 may have at least some of the metal bumps 108 formed thereon. The metal bumps may be formed with any suitable number, size, spacing, and arrangement. For example, nine metal bumps arranged in a three-by-three grid may be provided between the first and second metal pads 151 and 152 and also between the third and fourth metal pads 153 and 154. The number, size, arrangement, and spacing of the metal bumps may depend on the desired amount of bonding force.

Figure 3:
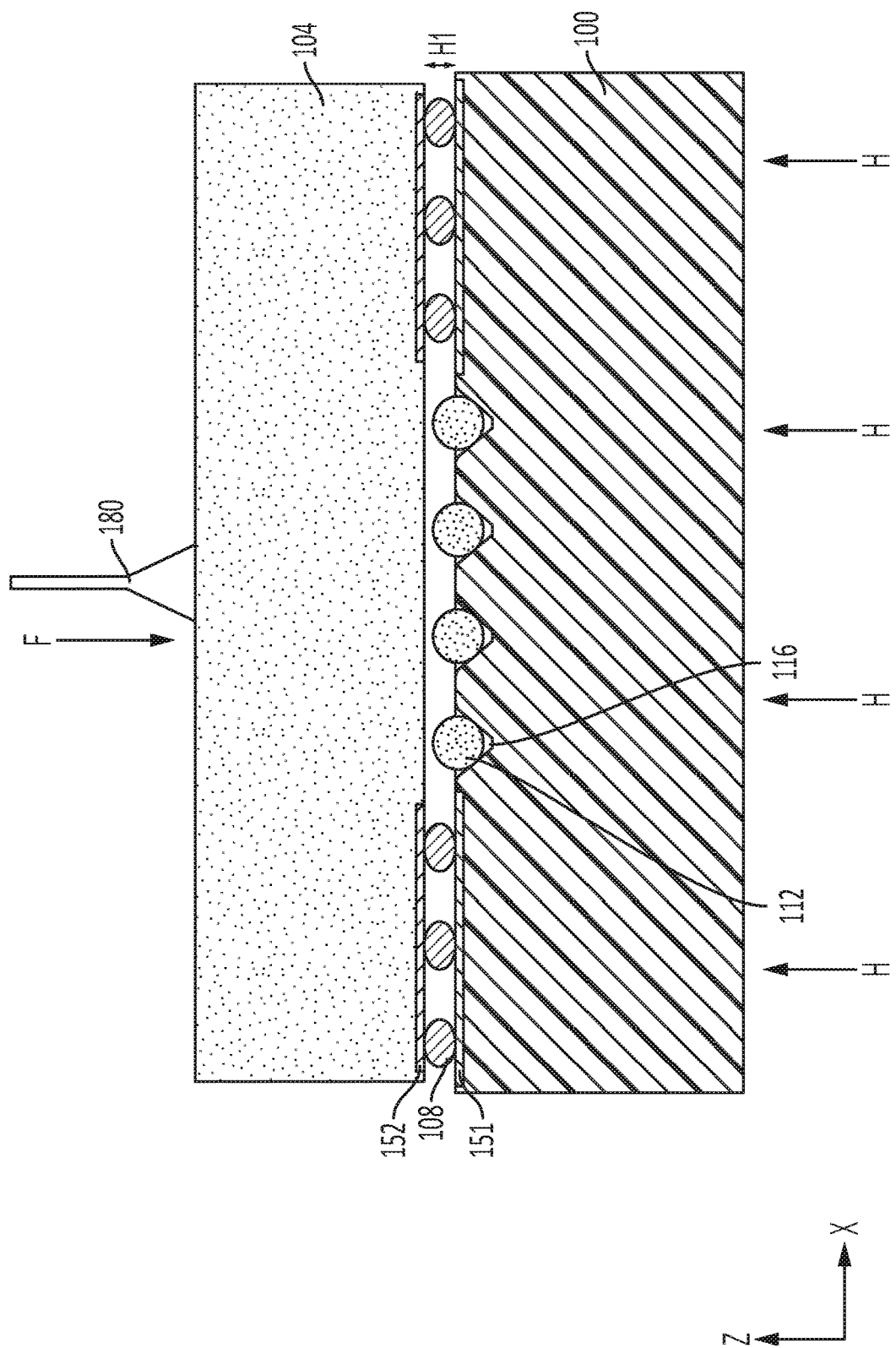
FIG. 3 is a cross-sectional view of the apparatus of FIG. 1 along the line I-I showing a thermosonic bonding process.
Figure 4:
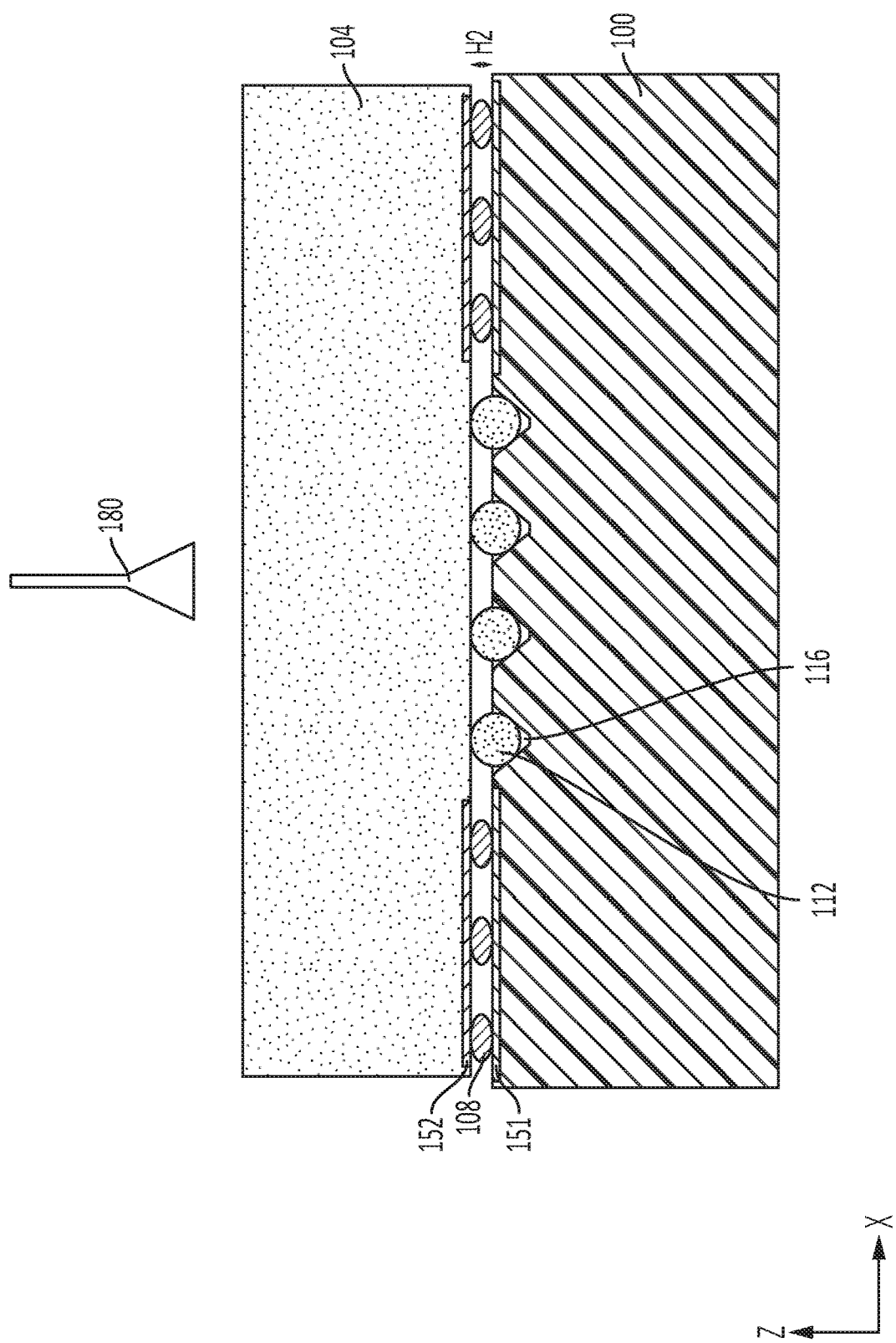
FIG. 4 is a cross-sectional view of the apparatus of FIG. 1 along the line I-I showing the apparatus after the thermosonic bonding process is complete.

When the metal bumps 108 are formed by wire bonding (as shown in FIG. 3), the metal bumps 108 may initially have a roundish shape and may have an initial thickness H1 prior to thermosonic bonding. During the thermosonic bonding process, the metal bumps 108 may be deformed such that the thickness of the metal bumps 108 is reduced to a second thickness H2, less than the initial thickness H1, after the thermosonic bonding is complete. When the metal bumps 108 are formed by the wire bonding process, a bottom surface of the cap 104 (e.g., a surface of the cap 104 facing the PIC 100) may be flat.

FIG. 5 illustrates an alternative embodiment in which the metal bumps 208 are formed by a sputtering or plating process. When the metal bumps are formed by sputtering or plating, the metal bumps may have a substantially flat shape. The thickness of the metal bumps 208 formed by the sputtering or plating process may be less than a thickness of metal bumps formed by a wire bonding process, a bottom surface of the cap 204 may have a stepped shape that provides a raised surface (e.g., an indentation or a channel) in the bottom surface of the cap 204 at an area overlapping the optical fibers 112, so that, when the cap 204 is placed on the PIC, before the thermosonic bonding process is performed, there is a gap between the fibers and the bottom of the cap 204 (a gap which is closed during the thermosonic bonding process). The stepped shape of the bottom surface of the cap 204 may be formed, for example, by etching the bottom surface of the cap 204. In the embodiment of FIGS. 3 and 4 and in the embodiment of FIG. 5, the height of the bumps may be reduced by between 5% and 50%, during the thermosonic bonding process.

The cap 104, 204 may be secured to the PIC 100 (by thermosonic bonding) at both ends of a group of fibers across which it extends, as shown for example in FIGS. 1 and 5. In other embodiments, the cap may extend across more than one group of fibers, and it may be secured to the PIC 100 (by thermosonic bonding) in a region between two adjacent groups of fibers, instead of, or in addition to, being secured to the PIC 100 at both ends of the cap 104, 204.

Referring again to FIGS. 1-4, after the first to fourth metal pads 151-154 and the metal bumps 108 are formed, the cap 104 may be thermosonically bonded to the PIC 100 through the metal bumps 108. Forming a thermosonic bond between two metal surfaces generally involves applying heat, pressure, and ultrasonic power to the two metal surfaces until the two metal surfaces bind together. Because heat, pressure, and ultrasonic power are all used in thermosonically bonding the cap 104 to the PIC 100, a bond may be formed using parameters for heat, pressure, and ultrasonic power that reduce the risk of damaging the PIC 100. For example, thermocompression bonding, in which only heat and pressure are applied, can also be used to bond two metals together, but may be performed at higher temperatures that may damage the PIC 100.

Each metal bump 108 may exert a tensile force on the cap (e.g., on the cap 104), which may contribute to a compressive force on the optical fibers 112, to reduce or avoid transverse motion of the ends of the optical fibers 112. Each bump may also provide a shear force on the cap as needed to counteract external shear forces that may arise if a pulling force is applied to any of the optical fibers 112. The latter force may be significantly greater than the tensile force required; the assembly may be designed to survive a pulling force on the optical fibers 112 of as much as 10 N per fiber, and a significant portion of this force may be transmitted to the cap 104 and, from the cap 104, through the metal bumps 108, to the PIC 100. Such a shear force may be provided both (i) by a pair of sets of metal bumps 108 (such as those between the first and second metal pads 151 and 152) that straddle the set of optical fibers 112, and also (ii) by a pair of sets of metal bumps 108 (such as those between the third and fourth metal pads 153 and 154) that do not straddle the set of optical fibers 112. The number of metal bumps used may be selected to be able to resist the largest expected shear force. In some embodiments, each bump has a transverse dimension (e.g., a diameter) of (or within 50% of) 35 microns, and may be capable of resisting a shear force of about 0.65 N (e.g., of between 0.15 N and 1.5 N). The metal bumps 108 may be on a grid with a pitch selected to be sufficiently coarse that when the bumps are compressed by the thermosonic bonding process, they do not widen sufficiently to contact their neighbors.

In an embodiment in which the cap 104 is secured to the PIC 100 by soldering (e.g., by forming a solder joint between (i) a metal feature, such as a metal pad, on the lower surface of the cap 104 and (ii) a metal feature on the upper surface of the PIC 100) a layer of solder may be present between the two metal features and any path through the joint (e.g., a load path) between the cap 104 and the PIC 100 may include a portion within solder. By contrast, in a thermosonically bonded assembly, some paths through the joint may not pass through solder (or solder may be absent entirely) and there may be at least one path from the metal element on the cap 104 (e.g., the metal bump 108) to the corresponding metal element on the PIC 100 (e.g., the corresponding second metal pad 151) that passes through one or more materials, each of the materials composed of gold, copper, or aluminum.

The thermosonic bonding process may occur as follows. The PIC 100 may be placed on a stage that is maintained at a constant temperature suitable for thermosonic bonding (e.g., 100° C.-120° C.). The optical fibers 112 may be positioned in the V-grooves 116, or the optical fibers 112 may already be present in the V-grooves 116. The cap 104 may be positioned over the PIC 100 such that the second and fourth metal pads 152 and 154 respectively overlap with the first and third metal pads 151 and 153, with metal bumps 108 between the first and second metal pads 151 and 152 and also between the third and fourth metal pads 153 and 154. The stage may apply heat H to the metal bumps 108 through the PIC 100 and through the first and third metal pads 151 and 153. In some embodiments, instead of or in addition to the heat H being applied to the metal bumps 108 through the PIC 100, heat may be applied to the metal bumps 108 by the application of the ultrasonic power. That is, in some embodiments, the application of the ultrasonic power may provide some or all of the heat provided to the metal bumps 108 during the thermosonic bonding. In embodiments in which the composition of the cap 104 differs from that of the PIC 100 (e.g., in which the cap 104 is composed of glass and the PIC is composed of silicon) the PIC 100 and the cap 104 may be brought to the average use temperature of the device (e.g., heated to 50° C. if the average expected temperature in use is 50° C.) before the thermosonic bonding is performed, to reduce stresses that may be present in operation as a result of (i) a difference between the coefficient of thermal expansion (CTE) of the PIC 100 and the CTE of the cap 104 and (ii) a difference between the temperature during thermosonic bonding and the temperature in operation.

A tool 180 may be placed in contact with a top surface of the cap 104 (e.g., with a surface of the cap 104 opposite to the surface of the cap 104 facing the PIC 100). The tool may 180 may apply a suitable force F and suitable ultrasonic power to the cap 104 for a suitable time period to allow a thermosonic bond to form between the metal bumps 108 and the metal pads that the metal bumps 108 were not formed on. For example, when the metal bumps 108 are all formed on the second and fourth metal pads 152 and 154, the thermosonic bond may be formed between the metal bumps 108 and the first and third metal pads 151 and 153. The line of action of the force F applied to the cap 104, 204, through the tool 180 (or the angle of the tool) may be selected such that the force applied by the cap 104, 204 to the optical fibers 112 is greatest at or near their ends, where precise positioning of the optical fibers 112 is most important.

The tool 180 may apply the force F in a downward direction (e.g., in the direction of the negative Z-axis) to apply a suitable force to the metal bumps 108. The ultrasonic power supplied by the tool 180 may propagate in transverse ultrasonic waves, i.e., waves producing displacements along a horizontal direction (e.g., along the direction of the X-axis or the Y-axis) perpendicular to the direction of the force F. The tool 180 may include a transducer (e.g., piezoelectric transducer) that applies vibrational (e.g., ultrasonic) energy to the cap 104. In some embodiments, the tool 180 may be hollow and may create a vacuum that can be used to pick up the cap 104. Accordingly, the tool 180 may also be used to position the cap 104 over the PIC 100. When the thermosonic bonding process is complete, the vacuum may be disabled (e.g., destroyed) to release the tool 180 from the cap 104 (see FIG. 4), and the assembly may be removed from the stage. The tool 180 is drawn schematically in FIGS. 3 and 4 and may not be to scale; in some embodiments, for example, the width of the tool is comparable to that of the cap 104, 204.

An epoxy (e.g., an index-matching epoxy) may be applied onto the optical fibers 112, for example, after the thermosonic bonding process is complete. For ease of illustration, the presence of epoxy is not shown using cross-hatching; as such, FIG. 2, for example, illustrates both (i) an embodiment in which epoxy is present between the cap 104 and the PIC 100 and in the V-grooves 116 under the fibers 112, and (ii) an embodiment in which epoxy is absent. The epoxy may have an index of refraction that is the same as, or similar to, the index of refraction of the optical fibers 112. In some embodiments, an index-matching material may be an epoxy used to provide an index matching function and also to secure the optical fibers 112 in a longitudinal direction, in a transverse direction, or both. In some embodiments, however, it may not be necessary for the epoxy to act as an adhesive for securing the fibers in the V-grooves because the cap 104, 204 may adequately perform that function. In some embodiments, both an index-matching material and an adhesive epoxy can be used together. In some embodiments, an index-matching epoxy or index-matching material may be included in a gap between the optical fibers 112 and the waveguides 122, and an adhesive epoxy may be included in the V-grooves 116 and on the optical fibers 112 to secure the optical fibers 112. For example, epoxy may be on and under the optical fibers 112 in the area of the V-grooves 116, and the index-matching epoxy or index-matching material may then be introduced into the trench 110, causing the index-matching material to wick up into the gaps between the optical fibers 112 and the waveguides 122. In other embodiments, the index matching material is instead applied before the epoxy. In some embodiments, a metal composition including or consisting of a metal may be included in the V-grooves 116, which may adhere to the optical fibers 112 to secure the optical fibers 112. The thermosonic bonding of the cap 104, 204 and the application of one or more of the epoxy and the index-matching material may occur in any suitable order. For example, application of the epoxy, the index matching material, or both the epoxy and the index matching material may occur before or after the thermosonic bonding of the cap 104, 204.

Although in some embodiments of the present disclosure optical fibers and corresponding waveguides are on a PIC, and a cap is thermosonically bonded to the PIC, the present disclosure is not limited thereto, and various suitable other embodiments will be understood by those skilled in the relevant art to be included in the present disclosure. For example, in some embodiments, the cap may cover the optical fibers without covering the waveguides. In some embodiments, the cap may be thermosonically bonded to the PIC to secure, onto the PIC, any suitable photonic component, of which an optical fiber is only one example. As used herein, a "photonic component" includes any optical component that may be secured to the PIC using methods described herein. For example, the cap may secure a lens (e.g., a cylindrically shaped lens) in a V-groove, or the cap may secure a turning mirror or prism, which may or may not be in a V-groove.

As used herein, when a second number is "within Y %" of a first number, it means that the second number is at least (1−Y/100) times the first number and the second number is at most (1+Y/100) times the first number. As used herein, the word "or" is inclusive, so that, for example, "A or B" means any one of (i) A, (ii) B, and (iii) A and B. As used herein, "a portion of" something means "at least some of" the thing, and as such may mean less than all of, or all of, the thing. As such, "a portion of" a thing includes the entire thing as a special case, i.e., the entire thing is an example of a portion of the thing.

As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, any structure or layer that is described as being "made of" or "composed of" a substance should be understood (i) in some embodiments, to contain that substance as the primary component or (ii) in some embodiments, to contain that substance as the major component.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although limited embodiments of a method of securing a photonic component to a PIC and a corresponding apparatus have been specifically described and illustrated herein, many modifications and variations will be apparent to those skilled in the art. Accordingly, it is to be understood that a method of securing a photonic component to a PIC and a corresponding apparatus employed according to principles of this invention may be embodied other than as specifically described herein. The invention is also defined in the following claims, and equivalents thereof.

What is claimed is:

1. A method of securing a photonic component to a semiconductor chip, the method comprising:
    forming a thermosonic bond between the semiconductor chip and a cap to fix the cap against the photonic component.

2. The method of claim 1, wherein the photonic component comprises an optical fiber in a V-groove in the semiconductor chip,
    wherein the method further comprises positioning the cap above the optical fiber with a metal bump between the semiconductor chip and the cap, and
    wherein the thermosonic bond is formed between the semiconductor chip and the cap through the metal bump to press the cap against the optical fiber.

3. The method of claim 2, wherein the forming of the thermosonic bond comprises:
    heating the metal bump;
    applying pressure to the metal bump; and
    applying ultrasonic power to the metal bump.

4. The method of claim 3, wherein a portion of the heat is applied to the metal bump by heating the semiconductor chip,
    wherein the pressure is applied to the metal bump by applying pressure to the cap, and
    wherein the ultrasonic power is applied to the metal bump by applying ultrasonic power to the cap.

5. The method of claim 2, wherein a first metal pad is fixed to one of the semiconductor chip or the cap, and the metal bump is between the first metal pad and the other one of the semiconductor chip or the cap, and
    wherein the thermosonic bond is formed between the metal bump and first metal pad.

6. The method of claim 5, wherein the metal bump comprises, as a major component, a material selected from the group consisting of gold, aluminum, and copper, and
    wherein the first metal pad comprises, as a major component, a material selected from the group consisting of gold, aluminum, and copper.

7. The method of claim 5, wherein the metal bump comprises gold as a major component and the first metal pad comprises aluminum as a major component or gold as a major component.

8. The method of claim 5, further comprising:
forming the first metal pad on the semiconductor chip; and
forming the metal bump on the cap,
wherein the thermosonic bond is formed between the metal bump and the first metal pad.

9. The method of claim 5, wherein a second metal pad is fixed to the other one of the semiconductor chip or the cap, and
wherein the metal bump is on the second metal pad.

10. The method of claim 2, wherein:
a waveguide is on the semiconductor chip and an end of the optical fiber is aligned with an end of the waveguide;
the positioning of the cap comprises positioning the cap to cover:
a first portion of the semiconductor chip adjacent to the optical fiber, and
a second portion of the semiconductor chip adjacent to the waveguide;
the metal bump is between the first portion of the semiconductor chip and the cap;
another metal bump is between the second portion of the semiconductor chip and the cap; and
the thermosonic bond between the semiconductor chip and the cap is formed through the metal bump and the other metal bump.

11. The method of claim 10, wherein:
the semiconductor chip has a plurality of V-grooves including the V-groove,
each of a plurality of optical fibers including the optical fiber is in a corresponding one of the plurality of V-grooves,
a plurality of waveguides including the waveguide are on the semiconductor chip, ends of the plurality of optical fibers are aligned with corresponding ends of the plurality of waveguides, and
the cap is thermosonically bonded to the semiconductor chip through a plurality of metal bumps including the metal bump and the other metal bump.

12. The method of claim 10, wherein a first metal pad is on the first portion of the semiconductor chip and a second metal pad is on the cap with the metal bump between the first metal pad and the second metal pad,
wherein a third metal pad is on the second portion of the semiconductor chip and a fourth metal pad is on the cap with the other metal bump between the third metal pad and the fourth metal pad,
wherein forming the thermosonic bond comprises:
forming a thermosonic bond between the metal bump and the first metal pad or the second metal pad, and
forming another thermosonic bond between the other metal bump and the third metal pad or the fourth metal pad.

13. The method of claim 1, wherein:
a plurality of first metal pads are on the semiconductor chip;
a plurality of second metal pads are on the cap, each of the second metal pads overlapping a corresponding first metal pad;
a corresponding plurality of metal bumps is between each of the second metal pads and the corresponding first metal pad; and
the forming of the thermosonic bond comprises forming a thermosonic bond between each of the second metal pads and the corresponding first metal pad through the corresponding plurality of metal bumps.

14. The method of claim 1, wherein the forming of the thermosonic bond comprises:
heating the semiconductor chip;
applying pressure to the cap; and
applying ultrasonic power to the cap.

15. The method of claim 1, wherein an end of the photonic component is aligned with an end of another photonic component.

16. An apparatus, comprising:
a semiconductor chip having a V-groove;
an optical fiber in the V-groove; and
a cap secured to the semiconductor chip through a bond comprising a metal bump, the cap fixing the optical fiber in the V-groove.

17. The apparatus of claim 16, further comprising a first metal pad fixed to one of the semiconductor chip or the cap and adjacent to the optical fiber,
wherein the metal bump bonds the first metal pad and the other one of the semiconductor chip or the cap together.

18. The apparatus of claim 17, wherein the first metal pad and the metal bump each comprises, as a major component, a material selected from the group consisting of gold, aluminum, and copper.

19. The apparatus of claim 17, wherein the metal bump comprises gold, as a major component, and
wherein the first metal pad comprises, as a major component, aluminum or gold.

20. The apparatus of claim 17, wherein the first metal pad is fixed to the semiconductor chip,
wherein the apparatus further comprises:
a second metal pad fixed to the cap, overlapping the first metal pad, and bonded to the cap through the metal bump;
a waveguide on the semiconductor chip, an end of the waveguide aligned with an end of the optical fiber;
a third metal pad fixed to the semiconductor chip and adjacent to the waveguide;
a fourth metal pad fixed to the cap and overlapping the third metal pad; and
another metal bump bonding the third metal pad and the fourth metal pad together.

* * * * *